US007352909B2

(12) United States Patent
Guleryuz (10) Patent No.: US 7,352,909 B2
(45) Date of Patent: Apr. 1, 2008

(54) WEIGHTED OVERCOMPLETE DE-NOISING

(75) Inventor: Onur G. Guleryuz, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 764 days.

(21) Appl. No.: 10/779,540

(22) Filed: Feb. 13, 2004

(65) Prior Publication Data

US 2004/0240545 A1 Dec. 2, 2004

Related U.S. Application Data

(60) Provisional application No. 60/475,401, filed on Jun. 2, 2003.

(51) Int. Cl.
*G06K 9/40* (2006.01)
(52) U.S. Cl. ............... 382/254; 382/260; 382/274; 382/275; 382/282; 358/3.26; 358/3.27; 358/463
(58) Field of Classification Search ............... 382/260, 382/274, 275, 261, 263, 264, 282; 358/3.26, 358/3.27, 463
See application file for complete search history.

(56) References Cited

U.S. PATENT DOCUMENTS

| 5,081,690 | A | | 1/1992 | Tan |
|---|---|---|---|---|
| 5,223,990 | A | * | 6/1993 | Yoshida et al. ............... 360/65 |
| 5,442,462 | A | * | 8/1995 | Guissin ...................... 358/463 |
| 5,715,052 | A | * | 2/1998 | Fujino et al. ............ 356/237.2 |
| 5,751,361 | A | | 5/1998 | Kim |
| 5,841,477 | A | | 11/1998 | Kim |
| 5,912,707 | A | | 6/1999 | Kim |
| 5,936,674 | A | | 8/1999 | Kim |
| 6,163,868 | A | | 12/2000 | Kondo et al. |
| 6,263,108 | B1 | | 7/2001 | Kondo et al. |
| 6,285,410 | B1 | * | 9/2001 | Marni ........................ 348/576 |
| 6,311,297 | B1 | | 10/2001 | Kondo et al. |
| 6,377,280 | B1 | | 4/2002 | Acharya et al. |
| 6,455,860 | B1 | * | 9/2002 | Mooney ..................... 250/397 |
| 6,496,604 | B1 | | 12/2002 | Bricourt |
| 6,549,674 | B1 | | 4/2003 | Chui et al. |
| 6,567,497 | B2 | * | 5/2003 | Reim .......................... 378/62 |
| 6,587,509 | B1 | * | 7/2003 | Suzuki et al. ........... 375/240.29 |

(Continued)

OTHER PUBLICATIONS

"Translation-Invariant De-Noising", R.R. Coifman and D.L. Donoho, Yale University and Stanford University, pp. 1-26.

(Continued)

*Primary Examiner*—Yosef Kassa (57) ABSTRACT

A de-noising algorithm that obtains an estimate of a noise-free portion of a noise-containing digital signal by applying a set of M linear transforms to the noise-containing digital signal, determining M initial de-noised estimates of each digital element of the digital signal, deriving a combination of weight factors for the M initial de-noised estimates of each digital element by formulating the combination as a linear estimation problem and solving it for the individual weight factors, and formulating a final de-noised estimate of each digital element based on the corresponding M initial de-noised estimates and the combination of weight factors. The combination of weight factors is an optimal combination that is derived such that a conditional mean squared error with respect to the initial de-noised estimates is minimized. The optimal determination is further determined based on a scaling factor that removes explicit dependence to noise variance and on one of several matrices.

31 Claims, 8 Drawing Sheets

U.S. PATENT DOCUMENTS

| | | | |
|---|---|---|---|
| 6,587,592 | B2 | 7/2003 | Georgiev et al. |
| 6,610,256 | B2 * | 8/2003 | Schwartz .................... 422/186 |
| 6,611,627 | B1 | 8/2003 | LaRossa et al. |
| 6,636,565 | B1 | 10/2003 | Kim |
| 6,643,406 | B1 | 11/2003 | Hajjahmad et al. |
| 6,859,565 | B2 * | 2/2005 | Baron ........................ 382/275 |
| 6,862,366 | B2 | 3/2005 | Bhattacharjya |
| 2003/0086623 | A1 | 5/2003 | Berkner et al. |

OTHER PUBLICATIONS

"Ideal Spatial Adaptation by Wavelet Shrinkage", David L. Donoho, Iain M. Johnstone, Dept. of Statistics, Stanford University, Stanford CA, Jun. 1992, Revised Apr. 1993, pp. 1-30.

"Error Resilient Video Coding Techniques", Real-Time Video Communications over Unreliable Networks, Yao Wang, et al., *IEEE Signal Processing Magazine*, Jul. 2000, pp. 61-82.

"A Dual-Tree Complex Wavelet Transform with Improved Orthogonality and Symmetry Properties", Nick Kingsbury, Signal Processing Group, Dept. of Engineering, University of Cambridge, Cambridge UK.

"On the Importance of Combining Wavelet-Based Nonlinear Approximation with Coding Strategies", Albert Cohen, et al., *IEEE Transactions on Information Theory*, vol. 48, No. 7, Jul. 2002, pp. 1895-1921.

"Concealment of Damaged Block Transform Coded Images Using Projections onto Convex Sets", Huifang Sun. et al., *IEEE Transactions on Image Processing*, vol. 4, No. 4, Apr. 1995, pp. 470-477.

"Spatially Adaptive Image Denoising Under Overcomplete Expansion", Xin Li and Michael T. Orchard, Department of Electrical Engineering, Princeton University, *IEEE 2000*, pp. 300-303.

Spatially Adaptive Wavelet Thresholding with Contex Modeling for Image Denoising, S. Grace Chang, et al., *IEEE Transactions on Image Processing*, vol. 9, No. 9, Sep. 2000, pp. 1522-1531.

"Error Control and Concealment for Video Communication: A Review", Yao Wang and Qin-Fan Zhu, *Proceedings of the IEEE*, vol. 86, No. 5, May 1998, pp. 974-997.

"De-Noising by Soft-Thresholding", David L. Donoho, *IEEE Transactions on Information Theory*. vol. 41. No. 3. May 1995, pp. 613-627.

"Analysis of Multiresolution Image Denoising Schemes Using Generalized Gaussian and Complexity Priors", Pierre Moulin and Juan Liu, *IEEE Transactions of Information Theory*, vol. 45, No. 3, Apr. 1999, pp. 909-919.

"Interpolation of Missing Data in Image Sequences", Anil C. Kokaram, et al., *IEEE Transactions of Image Processing*, vol. 4, No. 11, Nov. 1995, pp. 1509-1519.

"Information Loss Recovery for Block-Based Image Coding Techniques-A Fuzzy Logic Approach", Xiaobing Lee, et al., *IEEE Transactions on Image Processing*, vol. 4, No. 3, Mar. 1995, pp. 259-273.

"DCT Coefficients Recovery-Based Error Concealment Technique and Its Application to the MPEG-2 Bit Stream Error", Jong Wook Park, et al., *IEEE Transactions on Circuits and Systems for Video Technology*, vol. 7, No. 6, Dec. 1997, pp. 845-854.

"A Parametric Texture Model Based on Joint Statistics of Complex Wavelet Coefficients", Javier Portilla and Eero P. Simoncelli, Center for Neural Science, and Courant Institute of Mathematical Sciences, New York University, New York, NY, International Journal of Computer Vision 40(1), pp. 49-71, 2000.

"Filling-In by Joint Interpolation of Vector Fields and Gray Levels", Coloma Ballester, et al. *IEEE Transactions on Image Processing*, vol. 10, No. 8, Aug. 2001, pp. 1200-1211.

"Nonlinear approximation", Ronald A. DeVore, Department of Mathematics, University of South Carolina, Columbia, SC, *Cambridge University Press*, 1998, pp. 51-150.

"Errorless Restoration Algorithms for Band-Limited Images", Paulo Jorge S. G. Ferreira and Armando J. Pinho, *IEEE*, 1994, pp. 157-161.

Transform Coded Image Reconstruction Exploiting Interblock Correlation, Sheila S. Hemami and Teresa H.-Y. Meng, *IEEE Transactions on Image Processing*, vol. 4, No. 7, Jul. 1995, pp. 1023-1027.

"Combining Frequency and Spatial Domain Information for Fast Interactive Image Noise Removal", Anil N. Hirani, Takashi Totsuka, Sony Corporation.

"Reconstruction of Baseline JPEG Coded Images in Error Prone Environments", Shahram Shirani, et al., *IEEE Transactions on Image Processing*, vol. 9, No. 7, Jul. 2000, pp. 1292-1299.

"Fast DCT-Based Spatial Domain Interpolation of Blocks in Images", Ziad Alkachouh and Maurice G. Bellanger, *IEEE Transactions on Image Processing*, vol. 9, No. 4, Apr. 2000, pp 729-732.

Guleryuz, Onur G., "Weighted Overcomplete Denoising", Conference Record of the Thirty-Seventh Asilomar Conference on Signals, Systems and Computers, pp. 1992-1996, IEEE, Nov. 9, 2003.

* cited by examiner

(a) Noisy, 28.13 dB        (b) Standard, 40.12 dB (c) Diagonal, 41.30 db        (d) Significant only, 41.14 dB

WEIGHTED OVERCOMPLETE DE-NOISING

CONTINUING APPLICATION DATA

This application claims priority under 35 U.S.C. § 119(e) of provisional application Ser. No. 60/475,401, filed on Jun. 2, 2003. This application is also related to application Ser. Nos. 10/229,667 and 10/646,248, filed on Aug. 28, 2002 and Aug. 22, 2003 respectively and respectively entitled "Iterated De-Noising For Image Recovery" and "Image Recovery Using Thresholding and Direct Linear Solvers." The content of each of these applications is incorporated by reference herein.

BACKGROUND OF THE INVENTION

1. Field of the Invention

The present invention relates to techniques for removing noise from a digital representation (e.g., a digital image) using a set of overcomplete transforms and thresholding. The techniques may be employed in methods/algorithms which may embodied in software, hardware or combination thereof and may be implemented on a computer or other processor-controlled device.

2. Description of the Related Art

The signal in the additive independent and identically distributed (i.i.d.) noise problem continues to receive significant attention as it provides a benchmark for the accurate statistical modeling and representation of signals. The problem was first approached using a single transform and was later extended to overcomplete basis. Since then, the research in this area has thus far concentrated on obtaining better transforms and better thresholding techniques.

De-noising using linear transforms and thresholding relies on sparse decompositions with the utilized transforms. Under i.i.d. noise assumptions, it can be shown that transform coefficients with small magnitudes have very low signal-to-noise ratio (SNR), and a thresholding nonlinearity that effectively detects and removes (in the case of hard-thresholding) or reduces (in the case of soft-thresholding) these coefficients can be shown to improve the noise performance. Of course, this improvement is confined to the class of signals over which the utilized linear transforms provide sparse decompositions. However, if one imagines typically utilized localized transforms such as wavelets or block discrete cosine transforms (DCTs) over a particular image, it is apparent that many of the DCT or wavelet basis functions comprising the transform will overlap edges and other singularities. It is well known that sparsity properties do not hold over such features and de-noising performance suffers as a result. De-noising with overcomplete transforms tries to remedy this problem by averaging several de-noised estimates (corresponding to shifted versions of the same transform) at every pixel. It is hoped that some of the estimates will provide better performance than others, which will then be rectified in an average.

OBJECTS OF THE INVENTION

It is an object of the present invention to provide further improvements in the technology of de-noising digital signals using overcomplete transforms and thresholding by exploiting a separate degree of freedom not available using the above-discussed de-noising approaches.

It is another object of this invention to provide a digital image de-noising technique that involves formulating an optimal combination of de-noised estimates for each pixel and solving it for optimal estimates.

SUMMARY OF THE INVENTION

According to one aspect of this invention, methods for obtaining an estimate of a noise-free portion of a noise-containing digital signal are provided. One method comprises the steps of applying a set of M linear transforms to the noise-containing digital signal; determining M initial de-noised estimates of each digital element of the digital signal; deriving a combination of weight factors for the M initial de-noised estimates of each digital element by formulating the combination as a linear estimation problem and solving it for the individual weight factors; and formulating a final de-noised estimate of each digital element based on the corresponding M initial de-noised estimates and the combination of weight factors.

The set of M linear transforms is preferably applied to the digital signal as a whole or to each digital element.

For each linear transform in the set of M linear transforms, the M initial de-noised estimates of a particular digital element are preferably obtained by thresholding each transform coefficient that has an absolute value below a threshold and inverse transforming the non-thresholded transform coefficients.

Preferably, the combination of weight factors is an optimal combination that is derived such that a conditional mean squared error with respect to the initial de-noised estimates is minimized.

The set of M linear transforms may take any number of forms, including (i) a discrete cosine transform and a predetermined number of its overcomplete shifts, (ii) a wavelet transform and a predetermined number of its overcomplete shifts, or (iii) a Fourier transform and a predetermined number of its overcomplete shifts.

In preferred embodiments, the digital signal is an image or video frame comprised of a plurality of pixels, wherein each digital element comprises one or a group of pixels.

In another method, an estimate $\hat{x}$ of a noise-free portion $x$ of a noise-containing signal $y$ is obtained. The method comprises obtaining an estimate $\hat{x}(n)$ for each element n of $\hat{x}$ according to the following equation:

$$\hat{x}(n) = \sum_{i=1}^{M} \alpha_i(n)\hat{x}_i(n), n = 1, \ldots, N,$$

wherein weight factors $\alpha_i(n)$, $i=1, \ldots, M$, $n=1, \ldots, N$ are optimally determined by formulating a combination thereof as a linear estimation problem. Then, the N $\hat{x}(n)$ estimates are combined to obtain $\hat{x}$.

Preferably, $\alpha_i(n)$ are optimally determined such that $\hat{x}(n)$ minimizes a conditional mean squared error with respect to the initial de-noised estimates. More preferably, $\alpha_i(n)$ the optimal determination is further determined based on a scaling factor that removes explicit dependence to noise variance and on (i) a matrix that is dependent on an overcomplete transform set applied in obtaining each $\hat{x}(n)$, (ii) a diagonal matrix that is derived from a matrix that is dependent on an overcomplete transform set applied in obtaining each $\hat{x}(n)$, or (iii) a reduced diagonal matrix that is derived from a diagonal matrix that is, in turn, derived from a matrix that is dependent on an overcomplete transform set applied in obtaining each $\hat{x}(n)$.

In other aspects, the invention involves an apparatus including one or more components for performing the processing operations described above in connection with the steps of the methods. Such components may be implemented with hardware, software, or combination thereof. Hardware implementations may be realized using, for example, a general microprocessor, or one or more application specific integrated circuits (ASICs), digital signal processing circuitry, etc., or a combination thereof.

In accordance with further aspects of the invention, any of the above-described methods or steps thereof may be embodied in a program of instructions (e.g., software) which may be stored on, or conveyed to, a computer or other processor-controlled device for execution. Alternatively, the program of instructions may be integrated with hardware designed to perform one or more of the steps (e.g., one or more ASICs, digital signal processing circuitry, etc.).

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 7(a)-(e) and 8(a)-(d) illustrate noisy and de-noised portions of the test images.

DESCRIPTION OF THE PREFERRED EMBODIMENTS

A. Overview

The present invention is primarily directed to the familiar scenario in which i.d.d. noise in an image is removed using a set of overcomplete linear transforms and thresholding. Rather than the standard approach where one obtains the de-noised signal by ad hoc averaging of the de-noised estimates (corresponding to each transform), I formulate the optimal combination as a linear estimation problem for each pixel and solve it for optimal estimates. My approach is independent of the utilized transforms and the thresholding scheme. My derivation of the optimal estimates does not require explicit image statistics but relies solely on the assumption that the utilized transforms provide sparse decompositions. Yet my adaptive estimates utilize implicit conditional statistics, and they make the biggest impact around edges and singularities where standard sparsity assumptions fail.

Thus, in accordance with the present invention, after an overcomplete set of linear transformations (i.e., either shifted versions of the same transform or a general set of transforms $\{H_1, H_2, \ldots, H_M\}$ with $H_i H_i^{-1} = 1$, $i=1, \ldots, M$, where 1 is the identity matrix) are evaluated at each pixel and the transform coefficients thresholded (preferably, hard-thresholded) and inverse transformed to obtain several de-noised estimates, those estimates are not simply averaged to obtain the final result. Rather, this invention provides a technique for actively determining better estimates, which are then combined to obtain the final result.

In so doing, my formulation does not lose the simplicity of averaging, nor does it require any explicit statistics or parameters. Three estimators are derived in order of diminishing computational complexity. The first estimator, which is also the most potent, improves de-noising performance throughout, even when no singularities (e.g., edges) are present in the signal. The second estimator is very simple and solely requires the amount of expected noise energy remaining in pixels after the application of each transform. For hard-thresholding, this can be approximated by the number of coefficients that survive thresholding, or the number of non-zero coefficients (after thresholding) with basis functions overlapping the given pixel, to yield the third estimate. It should be noted that hard-thresholding a coefficient c yields 0 if $|c| \leq T$, and leaves the coefficient unchanged otherwise.

As is the case with the inventions of the above-identified related applications, the role of the utilized transformations remain very important. Indeed, the underlying operational basis of the algorithms of this invention is sparse image representations with the utilized linear transforms. Thus, the present invention may be used to remove noise from a digital image/video-frame and may also be embodied in recovery algorithms that employ spatial prediction to recover lost data in the image or video-frame. The details of the present techniques and algorithms of the present invention are described below.

B. Notation

Let $x(N \times 1)$ denote the signal, let $y = x + w$ denote the noise corrupted signal, and let $H_i$ ($N \times N$), $i=1, \ldots, M$ denote an overcomplete set of linear transforms. It is to be understood that $(N \times 1)$ determines the dimension of the matrix/vector x. In overcomplete de-noising, the transform coefficients of each transform is thresholded to obtain an estimate $\hat{x}_i$ of x, given y. These individual estimates are then combined to arrive at an overall estimate $\hat{x}$. The individual estimates $\hat{x}_i$ corresponding to each transform can be obtained in three stages for $i=1, \ldots, M$ as follows:

$$c_i = H_i y \tag{1}$$

$$\hat{c}_i = \tau(c_i) \tag{2}$$

$$\hat{x}_i = H_i^{-1}(\hat{c}_i) \tag{3}$$

where $c_i(N \times 1)$ are the transform coefficients due to $H_i$, $\hat{c}_i(N \times 1)$ are the thresholded coefficients, $\tau(\ldots)$ is the thresholding function, and $\hat{x}_i$ is the $i^{th}$ estimate of x. Note that the "thresholding" operation can be much more general as in $\hat{c}_i = \tau_i(c_1, \ldots, c_i, \ldots, C_M)$, $i=1, \ldots, M$. The individual estimates are combined at every pixel to arrive at the final de-noised signal via $$\hat{x}(n) = 1/M \sum_{i=1}^{M} \hat{x}_i(n), n = 1, \ldots, N \qquad (4)$$

In this invention, the above equation (1) is replaced with $$\hat{x}(n) = \sum_{i=1}^{M} \alpha_i(n)\hat{x}_i(n), n = 1, \ldots, N \qquad (5)$$

where the weights $\alpha_i(n)$, i=1, ..., M, n=1, ..., N are determined optimally as described below. For naturally overcomplete transforms such complex wavelets the techniques of this invention correspond to doing a pixel adaptive inverse transform. As will be become clear, this invention can accommodate a large variety of thresholding non-linearities; however, for the examples herein the thresholding function will be taken as a non-linearity that implements spatially uniform hard-thresholding on each coefficient via $$\hat{c}_i(k) = \begin{cases} c_i(k) & |c_i(k)| > T \\ 0 & |c_i(k)| \leq T \end{cases} \qquad (6)$$

for k=1, ..., N, where $c_i(k)$ is the $k^{th}$ transform coefficient of the $i^{th}$ transform, and T is a given threshold. To help later notation, index sets are defined as $$V_i = \{m | |c_i(m)| > T\} \qquad (7)$$

and the related diagonal selection matrices $$S_i(k, l) = \begin{cases} 1 & k = l, |c_i(k)| > T \\ 0 & \text{otherwise} \end{cases} \qquad (8)$$

With this notation and hard-thresholding, Equation (3) becomes $$\hat{x}_i = H_i^{-1} S_i H_i y \qquad (9)$$

C. Main Principles of the Invention

Figure 1:
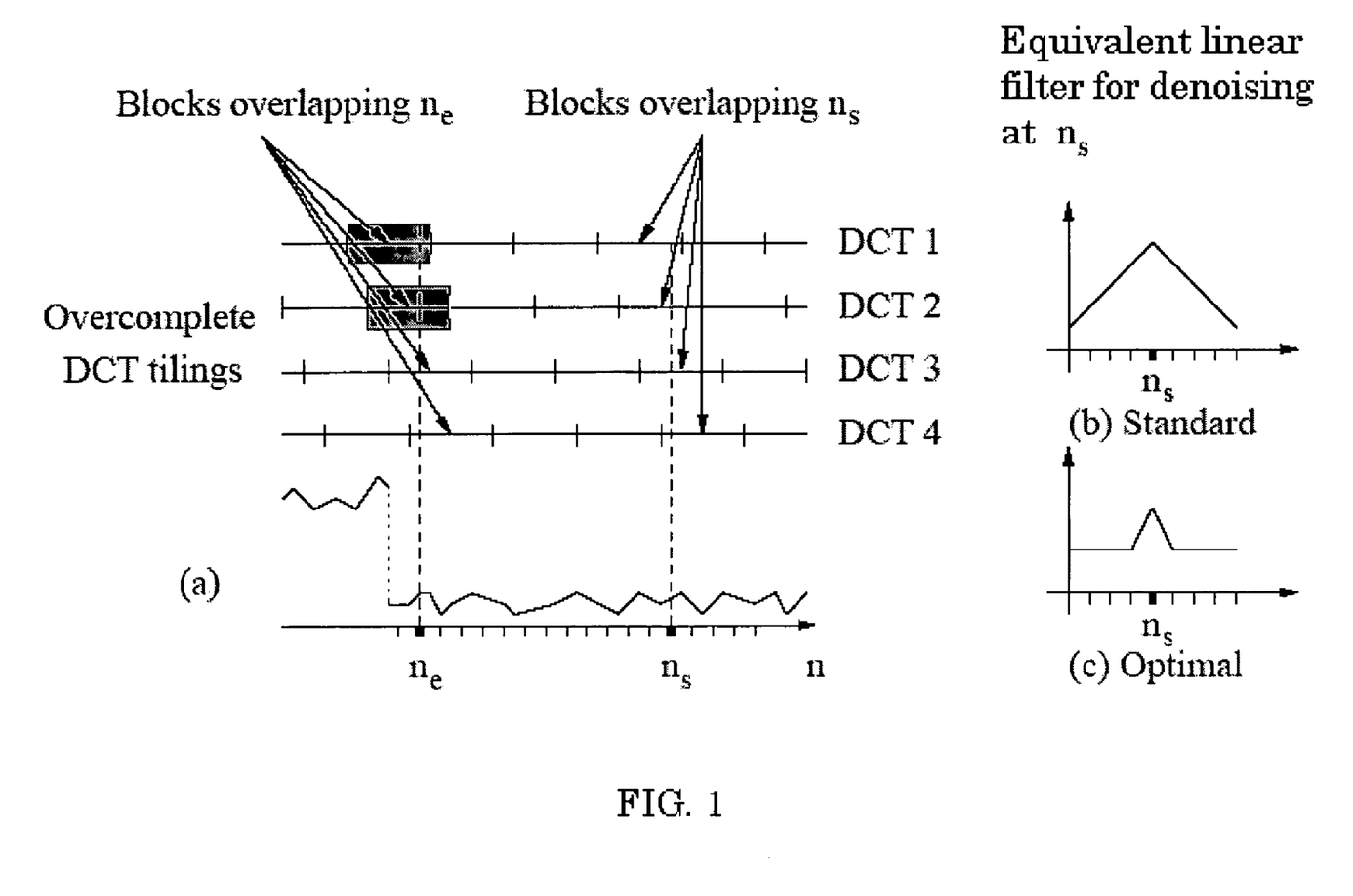
FIG. 1(a) illustrates a noise corrupted piecewise constant signal.
FIG. 1(b) illustrates the equivalent linear filter for de-noising at $n_s$.
FIG. 1(c) illustrates the optimal filter for de-noising at that point.

FIG. 1(a) shows a noise corrupted piecewise constant signal, which together with FIGS. 1(b) and (c), illustrates the main principles of the invention. Block DCT (4 by 1) decompositions are used for simplicity. FIG. 1(a) depicts an overcomplete system of four transforms (DCT 1, ..., DCT 4) that tile the signal as illustrated. Observe that the pixel identified at $n_e$ has four block DCTs overlapping it, one block from each transform. Of these four blocks, the first two overlap the "edge" (shown shaded) in the figure, whereas the latter two overlap smooth portions of the signal. From approximation principles, it is expected that the block DCTs overlapping the smooth regions will provide sparse decompositions and yield good individual de-noised estimates for the pixel at $n_e$, whereas the block DCTs overlapping the edge will not give rise to good de-noised estimates at $n_e$. Hence, rather than setting $\alpha_i(n)=0.25$ for i=1, ..., 4 in Equation (4), it is beneficial to give more weight to i=3,4 and less weight to i=1, 2 when the individual estimates are combined.

In the case of pixel $n_s$, consider the example case where the hard-thresholding operation only retains the DC terms of the DCT coefficients in the four overlapping blocks. For this case, while Equation (4) forms the equivalent filter shown in FIG. 1(b), the optimal is given by $\alpha_1(n_s)=\alpha_4(n_s)=0.5$, $\alpha_2(n_s)=\alpha_3(n_s)=0$ as shown in FIG. 1(c).

For convenience, zero mean quantities and orthonormal transforms are assumed. The objective is to derive the optimal weights in Equation (5) that minimize the conditional mean squared error, given the index sets $V_1, \ldots, V_i, \ldots, V_M$, $$E[|x(n)-\hat{x}(n)|^2 | V_1, \ldots, V_i, \ldots, V_M] \qquad (10)$$

where E[ ... ] denotes expectation. The main assumption is that the utilized transform provides a sparse decompositions, the thresholding is successful, and the individual de-noised estimates remove mostly noise, i.e., $$\hat{x}_i \approx x + w_i \qquad (11)$$

where $w_i$(N×1) is the remaining noise in the $i^{th}$ de-noised estimate with $E[xw_i^T]=0$, where $( \ldots )^T$ denotes transpose. For example, using hard-thresholding, $w_i$ only includes the transform coefficients of w in the index set $V_i$. In this sense, each $V_i$ is assumed to identify the non-zero coefficients of the transform $H_i$, which provides a sparse decomposition. Observe that $$w_i = H_i^T S_i H_i w \qquad (12)$$

since the $H_i$ are orthonormal.

Focusing attention on the $n^{th}$ pixel, using Equations (5) and (11), gives $$\hat{x}(n) = \sum_{i=1}^{M} \alpha_i(n)(x(n) + w_i(n)) \qquad (13)$$

The objective is to choose the $\alpha_i(n)$ so that $\hat{x}(n)$ minimizes Equation (10). This task becomes a conditional linear estimation problem where x(n) is estimated using observed quantities $x(n)+w_i(n)$ with the estimation weights $\alpha_i(n)$.

Let $\Gamma(n)=[\alpha_1(n) \ldots \alpha_M(n)]^T$, $\sigma_x^2(n)=E[x^2(n)]$, and $z(n)=[x(n)+w_1(n) \ldots x(n)+w_M(n)]^T$. Equation (13) becomes $$\hat{x}(n)=z(n)^T \Gamma(n) \qquad (14)$$

Using this form in Equation (10) and taking derivatives with respect to components of $\Gamma(n)$ gives $$\sigma_x^2(n)\begin{bmatrix} 1 \\ \vdots \\ 1 \end{bmatrix} = \left( \sigma_x^2(n)\begin{bmatrix} 1 & \cdots & 1 \\ \vdots & & \vdots \\ 1 & \cdots & 1 \end{bmatrix} + W(n) \right) \Gamma(n) \qquad (15)$$

where $W(n)_{p,q}=E[w_p^T w_q | V_1, \ldots, V_i, \ldots, V_M]$ and, as observed, $E[xw_i^T]=0$.

Let $u_n$(N×1) denote the unit vector that is 1 in the $n^{th}$ component and 0 otherwise. Using Equation (12) and under the i.i.d. noise assumption, the matrix elements of W(n) (M×M) can be written as $$W(n)_{p,q} = E[w_p(n)w_q(n) \mid V_1, \ldots, V_M] \quad (16)$$

$$= u_n^T H_p^T S_p H_p E[ww^T] H_q^T S_q H_q u_n \quad (17)$$

$$= \sigma_w^2 u_n^T H_p^T S_p H_p H_q^T S_q H_q u_n \quad (18)$$

$$= \sigma_w^2 G(n)_{p,q} \quad (19)$$

where $\sigma_w^2$ is the noise variance and $G(n)$ (M×M) is a matrix that is solely dependent on the overcomplete transform set and the index sets $V_i$.

Then, Equation (15) reduces to $$\lambda \begin{bmatrix} 1 \\ \vdots \\ 1 \end{bmatrix} = G(n)\Gamma(n) \quad (20)$$

where $\lambda$ is a scaling factor. Under the assumption $\sigma_x^2(n) \gg \sigma_w^2$, $\Sigma_i \alpha_i(n) = 1$ is obtained, which determines $\lambda$ and removes explicit dependence to statistical parameters $\sigma_x^2(n)$, $\sigma_w^2$, etc. Note however that the form of $G(n)$ depends on the index sets, and there is an implicit dependence on image statistics.

Since $G(n)$ is positive semidefinite, Equation (20) can be solved within the positive eigenspace of $G(n)$ to yield $\Gamma(n)$ whenever the rank of $G(n)$ is nonzero. For the zero rank case, $\Gamma(n)$ is assumed to be set to its standard value.

Referring to equation (20) as the "full solution," this solution is complicated as it requires the formation and the solution of $G(n)$ at every pixel. Looking at the form $G(n)$ through Equation (16), observe that the matrix element $(p, q)$ represents the cross correlation of noise remaining at pixel n after de-noising with the $p^{th}$ and $q^{th}$ transforms (divided by $\sigma_w^2$). Assuming these cross terms are negligible in comparison to other quantities and thereby setting the off-diagonal elements of $G(n)$ to zero yields a diagonal matrix $D(n)$ where $$D(n)_{p,q} = \begin{cases} G(n)_{p,q} & p = q \\ 0 & \text{otherwise} \end{cases} \quad (21)$$

The solution of Equation (20) with $G(n)$ replaced by $D(n)$ via $$\lambda \begin{bmatrix} 1 \\ \cdot \\ \cdot \\ \cdot \\ 1 \end{bmatrix} = D(n)\Gamma(n) \quad (22)$$

will be referred to as the "diagonal solution".

While much simpler, this solution still requires the keeping track of the actual values of the transform basis functions at every pixel since $$D(n)_{p,q} = u_n^T H_p^T S_p H_p u_n \quad (23)$$

This is straightforward for block transforms but it is necessary to compute the actual basis functions for transforms like wavelets obtained through iterated filter banks. Assuming that the transform basis functions have constant values in their spatial support, an even simpler equation can be obtained. Consider the $m^{th}$ basis function of the $p^{th}$ transform given by the $m^{th}$ row of $H_p$ via $H_p(m, n)$ $n=1, \ldots, N$. Let $c_p(m)$ determine the number of nonzero entries in $H_p(m, \ldots)$. For the given m and for $n=1, \ldots, N$, define $$F_p(m, n) = \begin{cases} 1/\sqrt{c_p(m)} & H_p(m, n) \neq 0 \\ 0 & \text{otherwise} \end{cases} \quad (24)$$

The "significant-only" solution is obtained by replacing the diagonal matrix $D(n)_{p,p}$ with $$\tilde{D}(n)_{p,q} = \begin{cases} u_n^T F_p^T S_p F_p u_n & p = q \\ 0 & \text{otherwise} \end{cases} \quad (25)$$

in Equation (22). Observe that for block transforms the diagonal entry $\tilde{D}(n)_{p,p}$ is determined by the number of nonzero coefficients (the total number of coefficients in a block minus the number of coefficients hard-thresholded to zero) produced by the $p^{th}$ transform with basis functions overlapping the $n^{th}$ pixel. The weight for the $p^{th}$ transform at a given pixel will thus be proportional to the inverse of the number of nonzero coefficients produced by the transform with basis functions overlapping the pixel.

Figure 2:
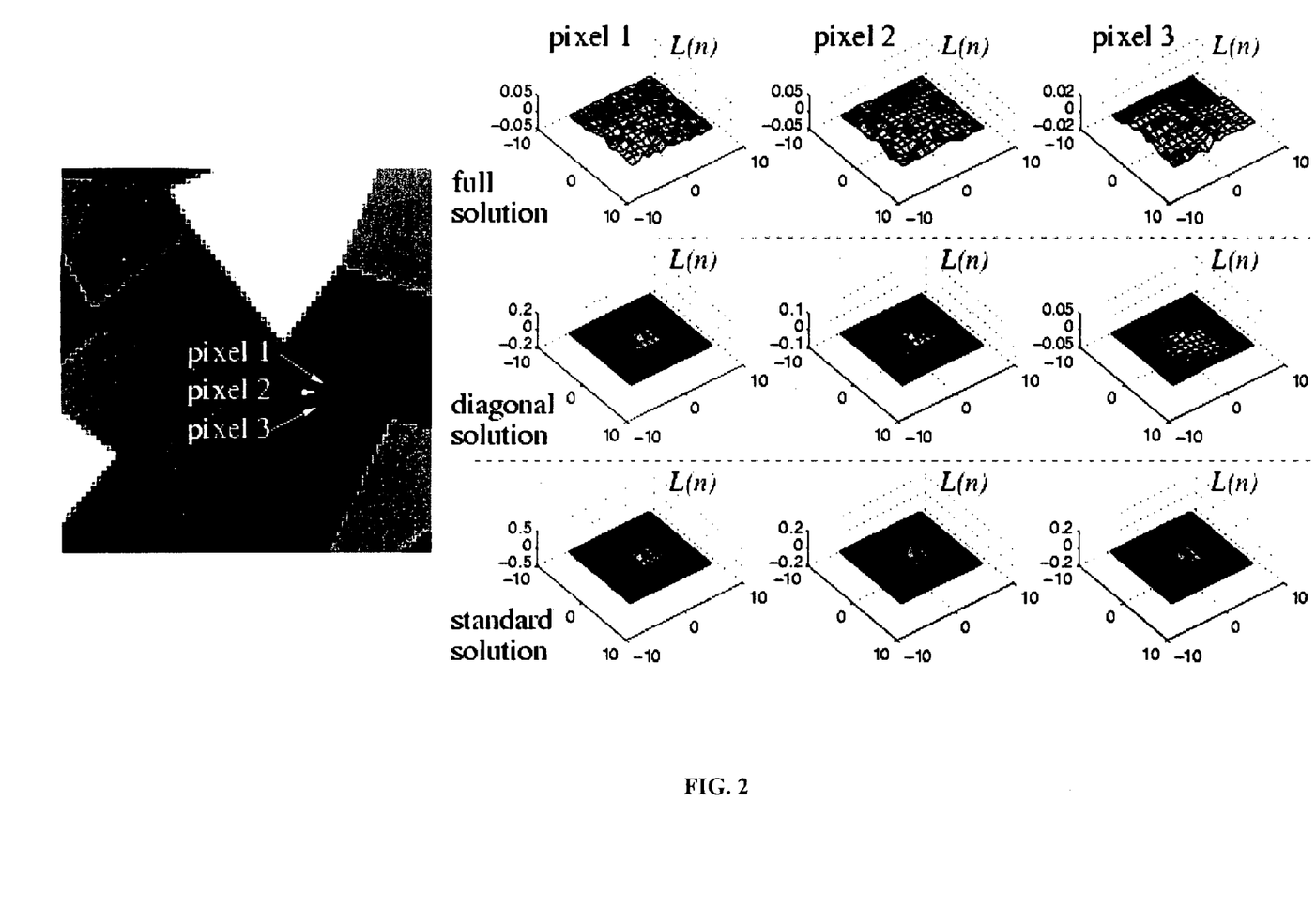
FIG. 2 illustrates the computed equivalent filters for the full, diagonal, and standard solutions at three pixels in the image voronoi.
Figure 3:
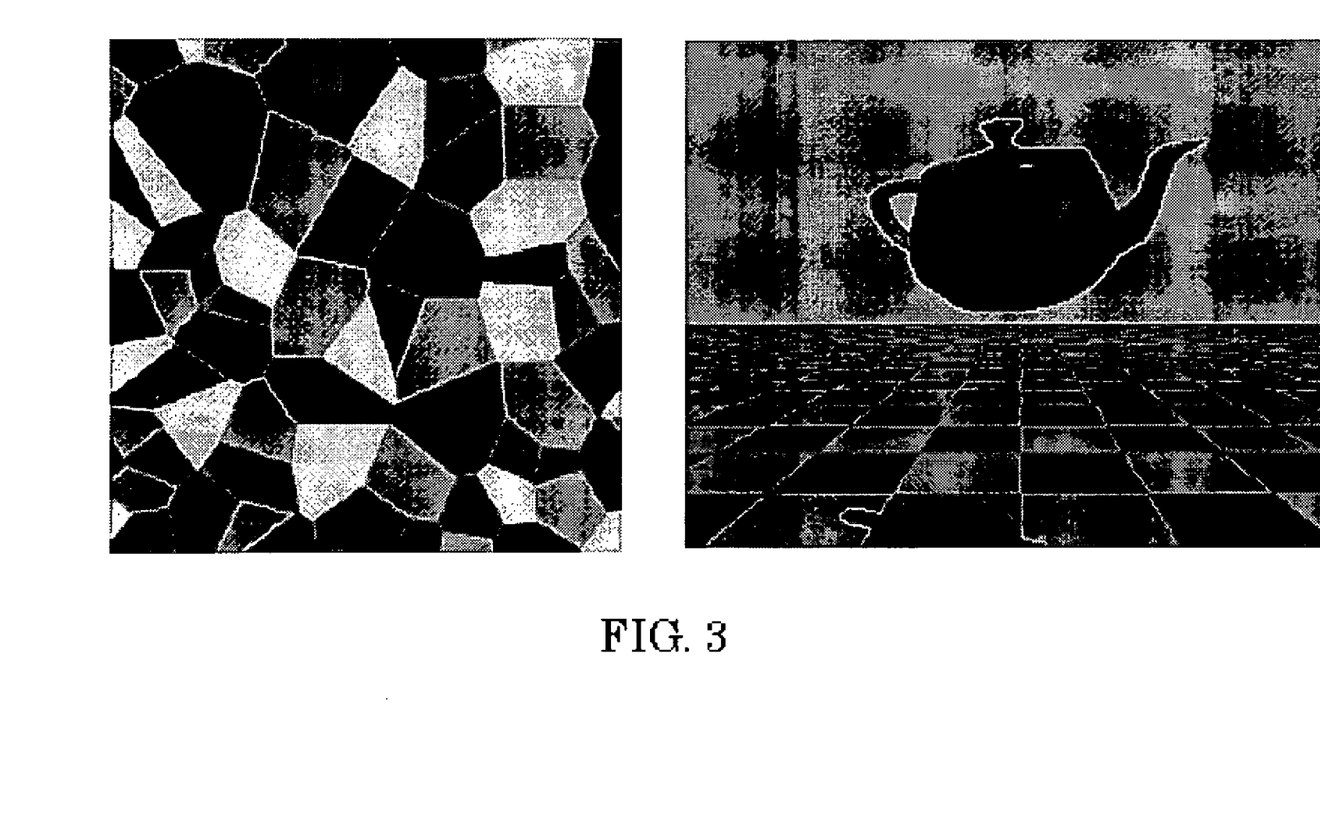
FIG. 3 illustrate the test images voronoi (256×256) and teapot (960×1280).

Using Equations (5) and (9) the final de-noised estimate can be constructed as $$\hat{x}(n) = \sum_{i=1}^{M} \alpha_i(n) \hat{x}_i(n) \quad (26)$$

$$= \left[ \sum_{i=1}^{M} \alpha_i(n) u_n^T H_i^T S_i H_i \right] y$$

$$= L(n)^T y$$

where $L(n) = [u_n^T (\Sigma_{i=1}^M \alpha_i(n) H_i^T S_i H_i)]^T$ (N×1). $L(n)$ can be thought of as an equivalent time varying linear filter that is applied to the noisy signal y to obtain the de-noised output. FIG. 2 illustrates the computed equivalent filters for the full, diagonal, and standard solutions at three pixels progressively situated away from an edge in the image voronoi as shown in the magnified portion of the image voronoi. (That entire image is also shown in FIG. 3, along with another test image, teapot, in FIG. 3.) The equivalent filters are constructed using fully overcomplete 8×8 DCTs, $\sigma_w = 5$. The 45°/135° axis in the plots are in column/row dimensions of the image. Point (0,0) is on top of the respective pixel, and it indicates that factor that is used by the equivalent filter to multiply that pixel. All solutions use the threshold that achieves the best respective image-wide peak signal-to-noise ratio (PSNR) performance.

Since a piecewise constant model is appropriate for this image, it is expected that $L(n)$ will average pixels in the black voronoi region to obtain the de-noised result. As can be seen in the figure, the standard solution does very little spatial averaging in this region. The spatial support of the filter is restricted to a very local neighborhood of the respective pixel, and it does not broaden appreciably even when the pixel moves away from the edge. On the other hand, the diagonal solution produces filters that are broader in the black voronoi region, which results in better spatial averaging and improved de-noising performance around edges. For this example, the filters that are the broadest in the black voronoi region are produced by the full solution, which performs significant spatial averaging even for pixel 1, the pixel closest to the edge. All solutions do a good job of not closing the edge, but only the solutions set forth in this invention produce filters that perform significantly broad averaging in the correct region.

D. Simulation Results

Figure 4:
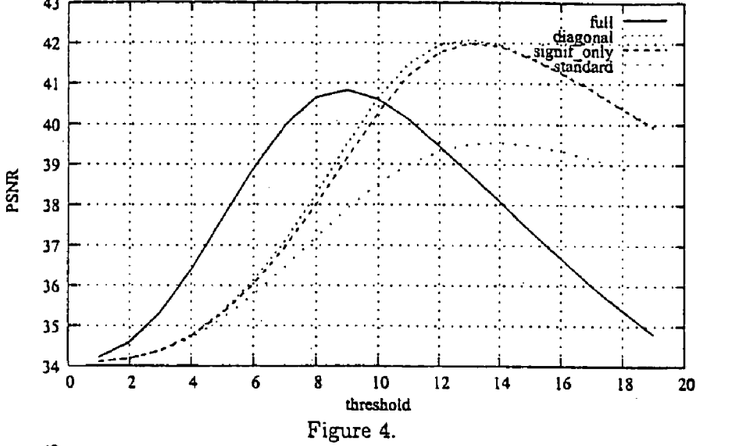
FIGS. 4, 5 and 6 illustrate peak signal-to-noise ratio (PSNR) vs. threshold curves for the full (FIG. 4 only), diagonal, significant-only, and standard solution systems achieved under different conditions.
Figure 5:
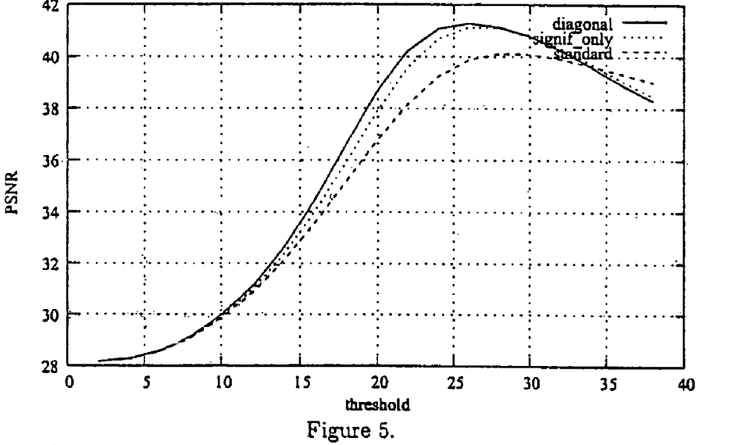
Figure 6:
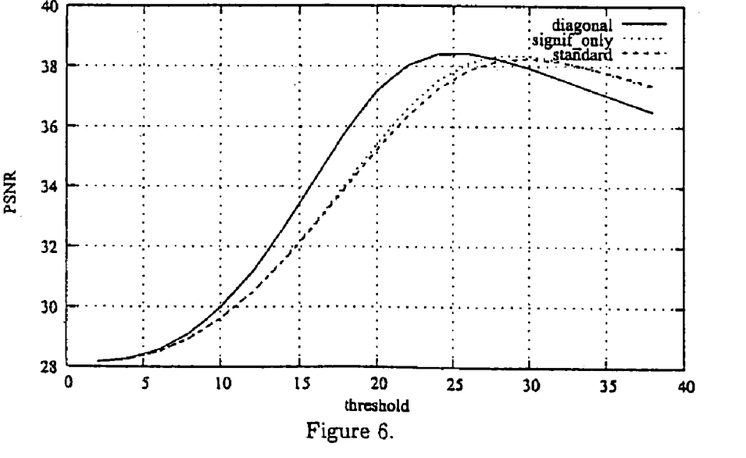
Figure 7:
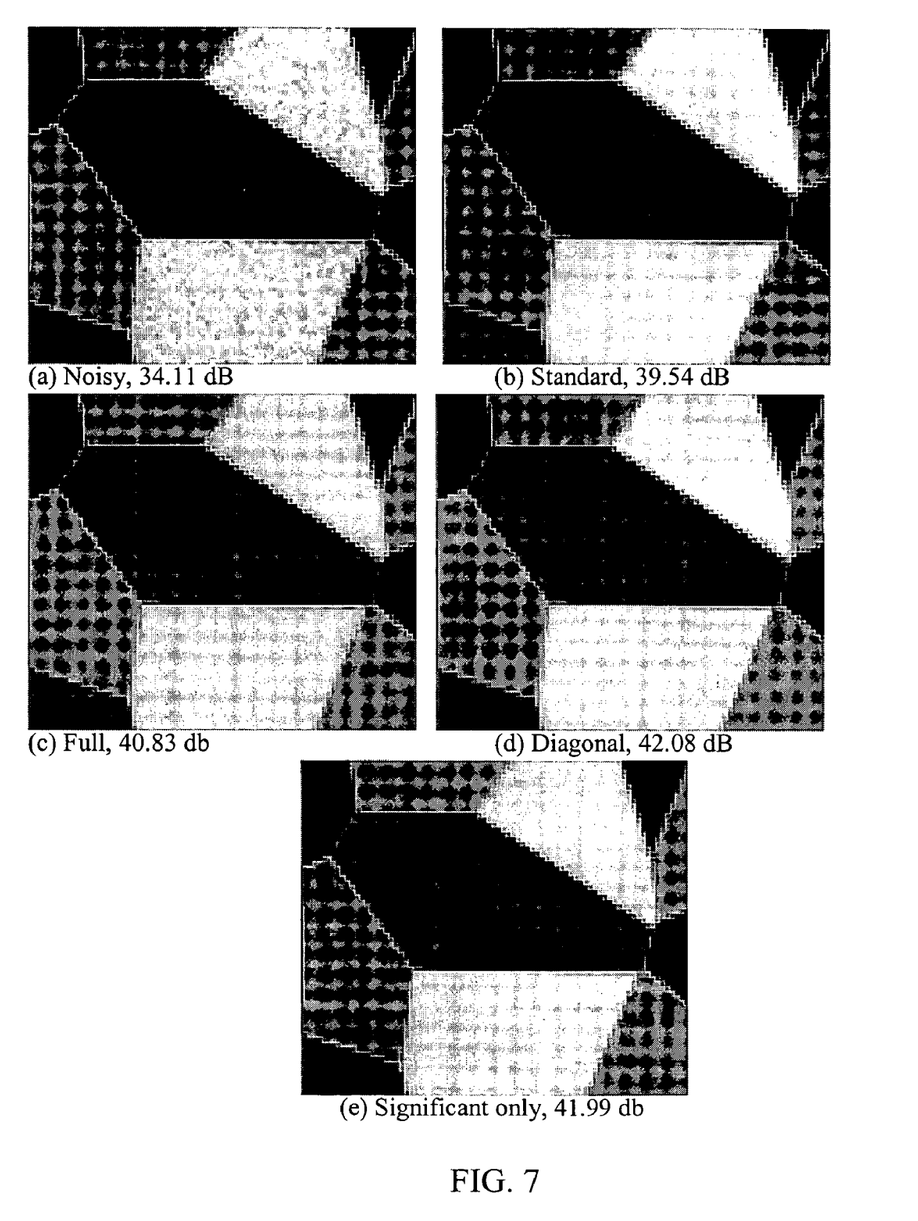
Figure 8:
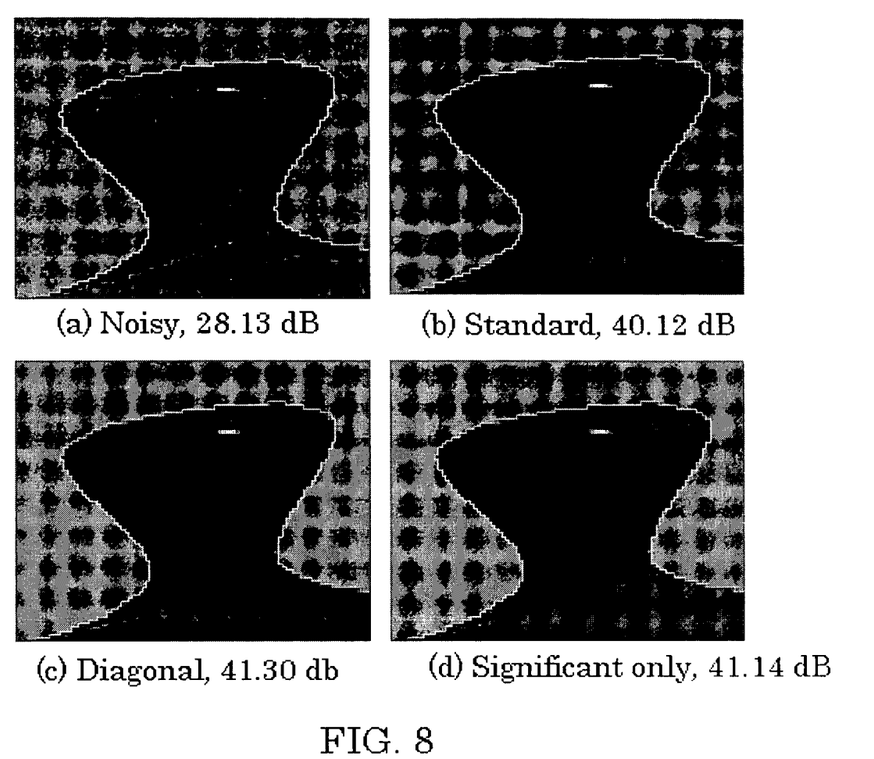

De-noising results for the two test images shown in FIG. 3 are presented. All techniques are shown at the threshold that achieves peak PSNR. The utilized 8×8 DCTs and the 3 level, orthonormal, Daubechies D8 wavelets are fully overcomplete. The PSNR vs. threshold curves for the full (FIG. 4 only), diagonal, significant-only and standard solution systems are shown in FIGS. 4-6. FIG. 4 is 8×8 DCT results on voronoi with $\sigma_w=5$; FIG. 5 is 8×8 DCT results on teapot with $\sigma_w=10$; and FIG. 6 is orthonormal D8 results on teapot with $\sigma_w=10$. FIGS. 7(a)-(e) and 8(a)-(d) illustrate noisy and de-noised portions of the images, FIG. 7(a)-(e) showing 8×8 DCT results on voronoi with $\sigma_w=5$ and FIGS. 8(a)-(d) showing 8×8 DCT results on teapot with $\sigma_w=10$. In FIG. 4, it can be seen that the PSNR for the full solution peaks at a much smaller threshold as compared to the other solutions.

The full solution is the most aggressive in exploiting the model of Equation (11) and is also the most susceptible to modeling failures. Using hard-thresholding, model failures inevitably happen at higher thresholds which limit the performance of the full solution. Better thresholding techniques are expected to improve the optimized solutions' relative performance. For wavelets, the obtained results are about 0.2 dB better than the standard system (on the standard image Lena, improvements over the standard system are around 0.1 dB at $\sigma_w=10$). Using hard-thresholding, the overcomplete transforms associated with the utilized wavelet banks produce comparable entries in $D(n)_{p,p}$ for p=1, . . . , M, which limits gains. Better thresholding techniques are expected to improve performance.

E. Algorithms

The above-described principles of the invention can be incorporated into de-noising algorithms. Referring to the flow diagram of FIG. 9, one such algorithm starts in step 901 by obtaining a noise corrupted signal y. In step 902, threshold T is set to, for example, a multiple of the standard deviation of the noise, or may be computed using another suitable statistical calculation or set to a fixed constant such as 10 or 40.

Figure 9:
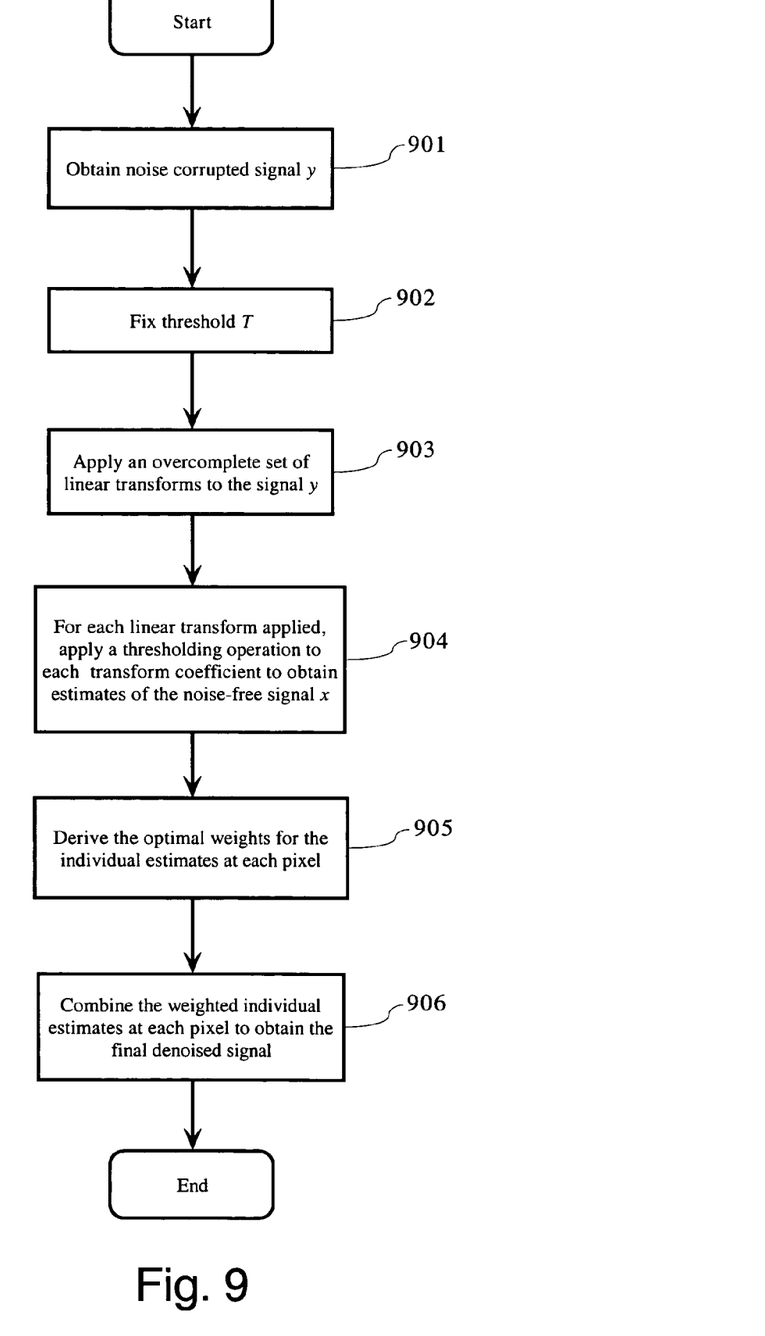
FIG. 9 is a flow diagram illustrating the basic process flow of a main algorithm of this invention.

In step 903, an overcomplete set of linear transforms is applied to the signal y. A thresholding (preferably a hard-thresholding) operation, such as that defined in Equation (6), is performed on the sets of transform coefficients in step 904 to obtain per-pixel estimates $\hat{x}_i$ of x, the signal without the noise factor w. Next, in step 905, the individual estimates at each pixel are evaluated and the optimal weights for the estimates are derived. The weighted estimates at each pixel are mathematically combined (e.g., averaged) to obtain a final de-noised signal (step 906).

F. Implementations and Applications

Figure 10:
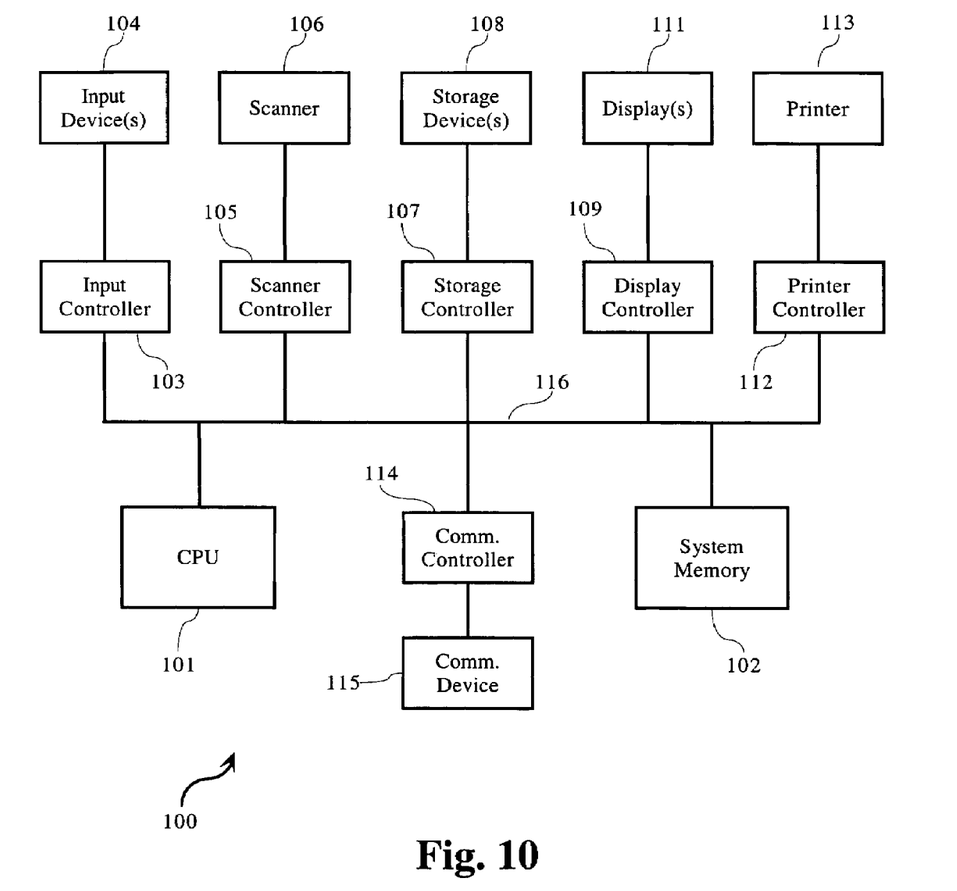
FIG. 10 is a block diagram illustrating an exemplary system which may be used to implement the techniques of the present invention.

FIG. 10 illustrates an exemplary system 100 which may be used to implement the processing of the present invention. As illustrated in FIG. 10, the system includes a central processing unit (CPU) 101 that provides computing resources and controls the computer. CPU 101 may be implemented with a microprocessor or the like, and may also include a graphics processor and/or a floating point coprocessor for mathematical computations. System 100 further includes system memory 102 which may be in the form of random-access memory (RAM) and read-only memory (ROM). The system memory may be used to store a de-noising program during its execution as well as data to-be-processed and intermediate results.

A number of controllers and peripheral devices are also provided, as shown in FIG. 10. Input controller 103 represents an interface to various input devices 104, such as a keyboard, mouse or stylus. There is also a controller 105 which communicates with a scanner 106 or equivalent device for digitizing documents including images to be processed in accordance with the invention. A storage controller 107 interfaces with one or more storage devices 108 each of which includes a storage medium such as magnetic tape or disk, or an optical medium that may be used to record programs of instructions for operating systems, utilities and applications which may include embodiments of programs that implement various aspects of the present invention. A display controller 109 provides an interface to a display device 111 which may be any known type of display. A printer controller 112 is also provided for communicating with a printer 113 for printing documents including images processed in accordance with the invention. A communications controller 114 interfaces with one or more communication devices 115 which enables system 100 to connect to remote devices through any of a variety of networks including the Internet, a local area network (LAN), a wide area network (WAN), or through any suitable electromagnetic carrier signals including infrared signals.

In the illustrated system, all major system components connect to bus 116 which may represent more than one physical bus. However, various system components may or may not be in physical proximity to one another. For example, the input data and/or the output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc.

While the present invention may be conveniently implemented with software, a hardware implementation or combined hardware/software implementation is also possible. A hardware implementation may be realized, for example, using ASIC(s), digital signal processing circuitry, or the like. As such, the claim language "device-readable medium" includes not only software-carrying media, but also hardware having instructions for performing the required processing hardwired thereon and also hardware/software combination. Similarly, the claim language "program of instructions" includes both software and instructions embedded on hardware. Also, the component(s) referred to in the apparatus claims includes any device or combination of devices capable of performing the claimed operations. Such devices may include instruction-based processors (e.g., CPUs), ASICs, digital processing circuitry, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

As the foregoing demonstrates, the present invention provides software- or hardware-based algorithms/techniques for removing noise from a digital signal using thresholding in conjunction with linear transforms that provide sparse decompositions. The algorithms of this invention have a broad range of applications and in general may be used to remove noise from any digital signal including video, still image, audio (speech, music, etc.) signals. The algorithms of this invention may also be used, with some modification, to predict lost regions of data in any of these types of signals, including error correction resulting from network transmission, recovery of damaged images, scratch removal, etc. In the algorithms of the present application, the thresholding operation is applied to each coefficient of a particular linear transform. In the data recovery algorithms briefly described below the thresholding is applied to select coefficients.

With respect to predicting lost regions of data, the algorithms of this invention may be incorporated into the more specific de-noising algorithms set forth in the above-identified related applications. The algorithms of one such application iteratively recovers the missing pixels in these layers. Upon filling the layers with an initial value, the algorithms select a threshold and evaluate several overcomplete transforms over the layers. Select transform coefficients hard-thresholded and inverse transformed to recover one layer of pixels while keeping the pixels in the other layers unaltered. Given L layers, this operation is repeated L times to recover all of the layers. After that, the algorithms reduce the threshold by a specific amount and proceed with the same computations for layer recovery starting with the first layer again. The algorithms terminate when the threshold reaches a predetermined lower level.

The algorithms of the other related application are the result of the inventor having recognized that most of the recovery performance typically comes from the initial iterations. Hence, the algorithms of this related application provide a fast alternative to the above related application's algorithms while still achieving most of the benefits thereof. In the algorithms of this related application, an initial thresholding decision is used to fix the set of transform coefficients that are thresholded to zero. However, this set is not recomputed at each iteration. Rather, this set is kept fixed for each layer, resulting in significant savings in computation, since the iterative solution is now reduced to a system of linear equations which can be solved directly, i.e., each layer is recovered in a single step without the need for iterations. Compared with the above related application's algorithms, the algorithms of this related application take a significant short-cut by directly solving for the pixels in each layer via the corresponding equation. In their simplest form, the algorithms of this related application use a single threshold to fully recover the layer pixels, i.e., the reduction of the threshold and further iterations are only desirable if very detailed information is to be recovered.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A method for obtaining an estimate of a noise-free portion of a noise-containing digital signal, comprising the steps of:

(a) applying a set of M linear transforms to the noise-containing digital signal;
   (b) determining M initial de-noised estimates of each digital element of the digital signal;
   (c) deriving a combination of weight factors for the M initial de-noised estimates of each digital element by formulating the combination as a linear estimation problem and solving it for the individual weight factors; and
   (d) formulating a final de-noised estimate of each digital element based on the corresponding M initial de-noised estimates and the combination of weight factors determined in steps (b) and (c) respectively.

2. The method of claim 1, wherein the set of M linear transforms is applied to the digital signal as a whole or to each digital element.

3. The method of claim 1, wherein, for each linear transform in the set of M linear transforms, the M initial de-noised estimates of a particular digital element are obtained by thresholding each transform coefficient that has an absolute value below a threshold and inverse transforming the non-thresholded transform coefficients.

4. The method of claim 1, wherein the combination of weight factors is an optimal combination.

5. The method of claim 1, wherein the combination of weight factors is derived such that a conditional mean squared error with respect to the initial de-noised estimates is minimized.

6. The method of claim 1, wherein the set of M linear transforms comprises (i) a discrete cosine transform and a predetermined number of its overcomplete shifts, (ii) a wavelet transform and a predetermined number of its overcomplete shifts, or (iii) a Fourier transform and a predetermined number of its overcomplete shifts.

7. The method of claim 1, wherein the digital signal is an image or video frame comprised of a plurality of pixels, wherein each digital element comprises one or a group of pixels.

8. A method for obtaining an estimate $\hat{x}$ of a noise-free portion x of a noise-containing signal y, comprising the steps of:

obtaining an estimate $\hat{x}(n)$ for each element n of $\hat{x}$ according to the following equation:

$$\hat{x}(n) = \sum_{i=1}^{M} \alpha_i(n)\hat{x}_i(n), n = 1, \ldots, N,$$

wherein weight factors $\alpha_i(n)$, i=1, ..., M, n=1, ..., N are optimally determined by formulating a combination thereof as a linear estimation problem; and
   wherein M is the number weight factors $\alpha_i(n)$ in the summation used to obtain the estimate $\hat{x}(n)$; and
   combining the N $\hat{x}(n)$ estimates to obtain $\hat{x}$.

9. The method of claim 8, wherein $\alpha_i(n)$ are optimally determined such that $\hat{x}(n)$ minimizes a conditional mean squared error with respect to the initial de-noised estimates.

10. The method of claim 9, wherein $\alpha_i(n)$ are optimally determined based on a scaling factor that removes explicit dependence to noise variance and on a matrix that is dependent on an overcomplete transform set applied in obtaining each $\hat{x}(n)$.

11. The method of claim 9, wherein $\alpha_i(n)$ are optimally determined based on a scaling factor that removes explicit dependence to noise variance and on a diagonal matrix that is derived from a matrix that is dependent on an overcomplete transform set applied in obtaining each $\hat{x}(n)$.

12. The method of claim 9, $\alpha_i(n)$ are optimally determined based on a scaling factor that removes explicit dependence to noise variance and on a reduced diagonal matrix that is derived from a diagonal matrix that is, in turn, derived from a matrix that is dependent on an overcomplete transform set applied in obtaining each $\hat{x}(n)$.

13. An apparatus for obtaining an estimate of a noise-free portion of a noise-containing digital signal, the apparatus comprising:
one or more components configured to:
(a) apply a set of M linear transforms to the noise-containing digital signal;
(b) determine M initial de-noised estimates of each digital element of the digital signal;
(c) derive a combination of weight factors for the M initial de-noised estimates of each digital element by formulating the combination as a linear estimation problem and solving it for the individual weight factors; and
(d) formulate a final de-noised estimate of each digital element based on the corresponding M initial de-noised estimates and the combination of weight factors determined in steps (b) and (c) respectively.

14. The apparatus of claim 13, wherein the set of M linear transforms is applied to the digital signal as a whole or to each digital element.

15. The apparatus of claim 13, wherein, for each linear transform in the set of M linear transforms, the M initial de-noised estimates of a particular digital element are obtained by thresholding each transform coefficient that has an absolute value below a threshold and inverse transforming the non-thresholded transform coefficients.

16. The apparatus of claim 13, wherein the combination of weight factors is an optimal combination.

17. The apparatus of claim 13, wherein the combination of weight factors is derived such that a conditional mean squared error with respect to the initial de-noised estimates is minimized.

18. The apparatus of claim 13, wherein the set of M linear transforms comprises (i) a discrete cosine transform and a predetermined number of its overcomplete shifts, (ii) a wavelet transform and a predetermined number of its overcomplete shifts, or (iii) a Fourier transform and a predetermined number of its overcomplete shifts.

19. The apparatus of claim 13, wherein the digital signal is an image or video frame comprised of a plurality of pixels, wherein each digital element comprises one or a group of pixels.

20. A computer-readable medium embodying a program of instructions for directing a machine to perform a process of obtaining an estimate of a noise-free portion of a noise-containing digital signal, the program comprising:
(a) instructions for applying a set of M linear transforms to the noise-containing digital signal;
(b) instructions for determining M initial de-noised estimates of each digital element of the digital signal;
(c) instructions for deriving a combination of weight factors for the M initial de-noised estimates of each digital element by formulating the combination as a linear estimation problem and solving it for the individual weight factors; and
(d) instructions for formulating a final de-noised estimate of each digital element based on the corresponding M initial de-noised estimates and the combination of weight factors determined in steps (b) and (c) respectively.

21. The computer-readable medium of claim 20, wherein instruction (a) comprises instructions for applying the set of M linear transforms to the digital signal as a whole or to each digital element.

22. The computer-readable medium of claim 20, wherein instruction (b) comprise instructions for obtaining the M initial de-noised estimates of each digital element by thresholding each transform coefficient, of each linear transform in the set of M linear transforms, that has an absolute value below a threshold and inverse transforming the non-thresholded transform coefficients.

23. The computer-readable medium of claim 20, wherein, in instruction (c), the combination of weight factors is an optimal combination.

24. The computer-readable medium of claim 20, wherein, in instruction (c), the combination of weight factors is derived such that a conditional mean squared error with respect to the initial de-noised estimates is minimized.

25. The computer-readable medium of claim 20, wherein, in instruction (a), the set of M linear transforms comprises (i) a discrete cosine transform and a predetermined number of its overcomplete shifts, (ii) a wavelet transform and a predetermined number of its overcomplete shifts, or (iii) a Fourier transform and a predetermined number of its overcomplete shifts.

26. The computer-readable medium of claim 20, wherein the digital signal is an image or video frame comprised of a plurality of pixels, wherein each digital element comprises one or a group of pixels.

27. A computer-readable medium embodying a program of instructions for directing a machine to perform a process of obtaining an estimate $\hat{x}$ of a noise-free portion x of a noise-containing signal y, the program comprising:
instructions for obtaining an estimate $\hat{x}(n)$ for each element n of $\hat{x}$ according to the following equation:

$$\hat{x}(n) = \sum_{i=1}^{M} \alpha_i(n)\hat{x}_i(n), n = 1, \ldots, N,$$

wherein weight factors $\alpha_i(n)$, i=1, ..., M, n=1, ..., N are optimally determined by formulating a combination thereof as a linear estimation problem; and
wherein M is the number weight factors $\alpha_i(n)$ in the summation used to obtain the estimate $\hat{x}(n)$; and
instructions for combining the N $\hat{x}(n)$ estimates to obtain $\hat{x}$.

28. The computer-readable medium of claim 27, wherein $\alpha_i(n)$ are optimally determined such that $\hat{x}(n)$ minimizes a conditional mean squared error with respect to the initial de-noised estimates.

29. The computer-readable medium of claim 28, wherein $\alpha_i(n)$ are optimally determined based on a scaling factor that removes explicit dependence to noise variance and on a matrix that is dependent on an overcomplete transform set applied in obtaining each $\hat{x}(n)$.

30. The computer-readable medium of claim 28, wherein $\alpha_i(n)$ are optimally determined based on a scaling factor that removes explicit dependence to noise variance and on a diagonal matrix that is derived from a matrix that is dependent on an overcomplete transform set applied in obtaining each $\hat{x}(n)$.

31. The computer-readable medium of claim 28, $\alpha_i(n)$ are optimally determined based on a scaling factor that removes explicit dependence to noise variance and on a reduced diagonal matrix that is derived from a diagonal matrix that is, in turn, derived from a matrix that is dependent on an overcomplete transform set applied in obtaining each $\hat{x}(n)$.

* * * * *